United States Patent [19]

Hollstein

[11] 3,907,735

[45] Sept. 23, 1975

[54] LAMINATING WAX COMPOSITION

[75] Inventor: Elmer J. Hollstein, Wilmington, Del.

[73] Assignee: Sun Oil Company, Philadelphia, Pa.

[22] Filed: Sept. 1, 1970

[21] Appl. No.: 68,801

Related U.S. Application Data

[63] Continuation-in-part of Ser. No. 706,738, Jan. 16, 1968, abandoned, which is a continuation-in-part of Ser. No. 558,466, June 17, 1966, abandoned.

[52] U.S. Cl. ..................... 260/28.5 A; 117/155 UA
[51] Int. Cl.² ......................................... C08L 91/08
[58] Field of Search .............................. 260/28.5 A

[56] References Cited

UNITED STATES PATENTS 3,496,125   2/1970   Boyer.............................. 260/28.5 A

*Primary Examiner*—Paul R. Michl
*Attorney, Agent, or Firm*—George L. Church; Donald R. Johnson; Richard P. Maloney

[57] ABSTRACT

Laminating wax compositions comprising petroleum wax containing 1 to 50 weight percent of solid atactic propylene-ethylene terminal block copolymer.

2 Claims, 2 Drawing Figures

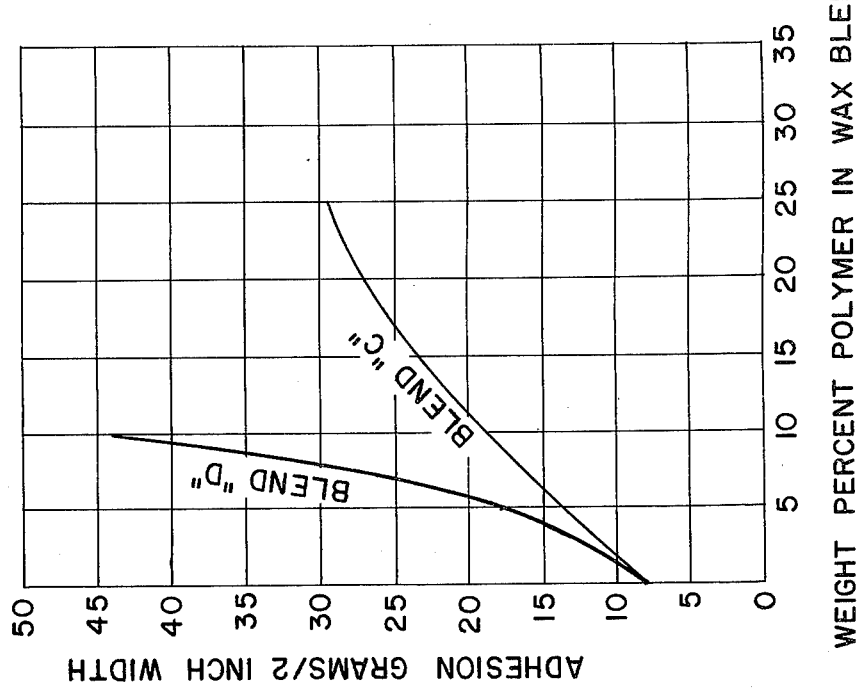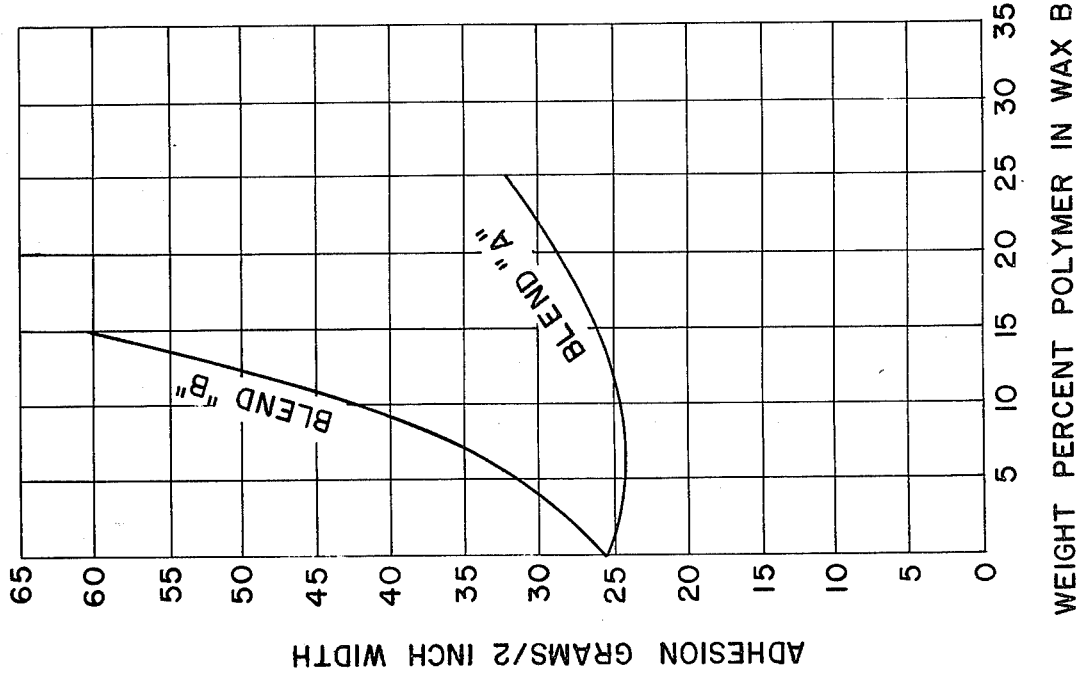

3,907,735

LAMINATING WAX COMPOSITION

CROSS REFERENCE TO RELATED APPLICATIONS

This application is a continuation-in-part of Ser. No. 706,738 filed Jan. 16, 1968 and now abandoned which in turn is a continuation-in-part of application Ser. No. 558,466 filed June 17, 1966 and now abandoned.

BRIEF SUMMARY OF THE INVENTION

This invention relates to an improved coating wax composition and to articles coated therewith. It particularly relates to improved laminating wax compositions containing solid atactic propylene-ethylene block copolymers.

BACKGROUND OF THE INVENTION

The use of wax compositions containing polymeric additives to coat fibrous sheets and containers is well known in the art. Also, it has previously been disclosed that the atactic fractions of the homopolymer of propylene are particularly useful as a wax additive, e.g., see U.S. Pat. No. 3,090,538. When substantial amounts of atactic polypropylene are added to wax, the resulting composition is significantly improved in adhesive and viscosity characteristics and therefore attractive as a laminating or coating wax composition. Normally to achieve commercially desirable adhesive and viscosity characteristics in coating or laminating wax compositions, it is necessary to include large amounts of the atactic propylene polymer additive, i.e., 25–50 weight percent in the composition. However, a coating or laminating wax composition containing large amounts of atactic polypropylene often does not have some of the other desirable characteristics such as surface gloss, gloss retention, and hardness as measured by penetration. The loss of these desirable properties is believed to be the result of the high concentration of atactic polypropylene in the composition. It is therefore desirable to provide a laminating or coating wax composition containing only small amounts of atactic polymer yet providing a composition having the desired adhesive and viscosity characteristics. The compositions of the present invention accomplish that end.

DESCRIPTION OF THE INVENTION

It is an object of this invention to provide an improved coating wax composition. It is a specific object of this invention to provide a superior laminating wax composition containing relatively minor amounts of atactic propylene-ethylene terminal block copolymer.

It has now been discovered that by the addition of small quantities of an atactic propylene-ethylene terminal block copolymer to a wax composition there is provided a laminating wax composition of superior adhesion and viscosity characteristics without sacrifice of the other desirable physical characteristics. It has particularly been discovered that the desirable adhesion and viscosity properties characteristic of wax compositions containing large amounts of atactic polypropylene can be reproduced using considerably less atactic solid propylene-ethylene block copolymer. This invention has been found to be especially suitable for use in petroleum waxes, particularly paraffin wax.

Petroleum waxes suitable for the purposes of the present invention are refined crystalline waxes and are well known standard articles of commerce. These waxes can be obtained by well known dewaxing procedures from waxy lubricating oils such as by solvent dewaxing with a methyl ethyl ketone-toluene mixture, methylisobutyl ketone, propane, and the like. The precipitated wax crystals are removed by centrifuging or filtering to form a slack wax, and then are preferably further purified to form scale wax and refined wax. Preferably the refined waxes contain less than 0.5 percent by weight of contaminating oil. For the purposes of the present invention the term "wax" as hereinafter used is meant to describe the above-defined petroleum waxes including both paraffin and microcrystalline wax, and mixtures thereof.

The solid atactic propylene-ethylene terminal block copolymers of the compositions of the present invention can be recovered from a particular low pressure process of copolymerization of propylene and ethylene with catalyst systems made up of a partially reduced, heavy, transition metal halide and a reducing metalcontaining compound. Polymerization of olefins via low pressure procedures is generally described in the literature, e.g., see Belgian Pat. No. 538,782, and British Pat. No. 994,416.

In the process the polymers are prepared by polymerizing the constituent monomers in the desired proportions with the aid of certain polymerization catalysts, e.g., see above-mentioned Belgian patent and British patent. The catalysts are solid, insoluble, reaction products obtained by partially reducing a reducible, heavy transition halide of a Group IVb or VIb or VIII metal with a reducing Group I and III metal-containing material such as an organometallic compound of an alkali, alkaline earth, rare earth metal or zinc. These stereospecific catalyst systems and their preparation are well known to those skilled in the art.

The alpha-olefin polymerization products obtained from the above-disclosed methods are mixtures of polymers with different structures and different molecular weights and can be fractionated by solvents, and thus separated fractions being polymers of different structures and different molecular weights. In the polymerization process using an inert hydrocarbon polymerization medium such as pentane, hexane, or heptane, the product obtained will be in two forms: first, that of a high molecular weight solid crystalline polymer powder which is insoluble in the polymerization solvents, and second, a solid predominantly amorphous tacky, solvent soluble, low molecular weight polymer fraction.

Normally the insoluble polymer product is recovered from the solvent containing the dissolved polymer fractions by centrifuging the slurry or by filtration or both. The recovered insoluble polymer product is often subsequently washed with alcohol and dried to yield a white powdery high molecular weight, highly crystalline polymer product. This polymer fraction is normally referred to as the crystalline fraction.

The liquid phase separated from the polymer slurry is often subject to flash evaporation to recover the hydrocarbon solvent for reuse and also to recover the solvent soluble polymer product. This product which is soluble in the hydrocarbon solvent is normally referred to as the atactic fraction and is the polymer product which forms a part of the compositions of the present invention.

In general it has been reported that the heptane-soluble polymer fraction often referred to as the atactic fraction is composed of three polymer types according to molecular structure, namely, crystalline which is defined above; amorphous polypropylene which is defined as a polymer of a non-stereoregular structure, which polymer is not crystallizable and stereoblock polymer which has been described as a generally linear alpha-olefin polymer having crystallizable segments of stereoregular structure and non-crystallizable segments of irregular structure in the same molecule. For the purposes of the present invention, the above definition of atactic polymer as being synonomous with the heptane-soluble fraction of the stereospecific polymerization polymer product will be adhered to, and the copolymer of the present invention is termed solid atactic propylene-ethylene terminal block copolymer (PEBC).

One method of producing the solid atactic propyleneethylene terminal block copolymers of the present invention comprises charging to a 50-gallon autoclave having an agitator for mixing disposed therein and a means for controlling heat transfer such as a steam jacket, 25 gallons of an inert liquid hydrocarbon containing 10 to 100 p.p.m. hydrogen and having dispersed therein a coordinate complex catalyst mixture. The copolymer is made in two stages during the first of which the autoclave is maintained at a temperature in the range of 100°–170°F. Pressure is maintained in the autoclave in the range of 80–120 p.s.i.g. by feeding propylene monomer, the introduction of which initiates polymerization of the first segment of the copolymer molecule. When the desired amount of propylene monomer is polymerized, the propylene feed is discontinued and the pressure is then maintained by introduction of ethylene or a mixture of propylene and ethylene monomer in a predetermined molar ratio according to the type of copolymer desired. The introduction of the monomer mix initiates the second phase of the copolymer polymerization. The second or final phase of the copolymer polymerization is terminated when the desired amount of monomer mix has been fed to the autoclave. The reaction is thereafter killed by introducing methanol into the hot reaction mixture in sufficient quantities to deactivate the catalyst therein. The deactivated mixture is subsequently withdrawn from the autoclave and the solid or crystalline copolymer product is separated from the polymerization slurry by filtering. The filtrate from this separation containing the atactic propyleneethylene block copolymer in solution is then subject to flash evaporation or steam stripping whereby a solid atactic propylene-ethylene block copolymer is recovered from the polymerization solvent. This is the polymer product which forms a part of the composition of the present invention.

Specifically, the copolymer product which forms a part of the present invention is the solid predominately amorphous heptane-soluble fraction recovered from the copolymerization of major amounts of propylene and minor amounts of ethylene using a stereospecific catalyst system as hereinabove described. This copolymer product is normally recovered from a stereospecific polymerization process of the type described above wherein the first step comprises propylene polymerization and the second step comprises propyleneethylene copolymerization. The polymer is characterized as being amorphous and having a molecular weight in the range of 1,000 to 300,000, a density in the range of 0.82 to 0.91 and being comprised of polymerized propylene containing 1–30 percent by weight of copolymerized ethylene in the polymer chain. For purposes of the compositions of the present invention the atactic propylene-ethylene terminal block copolymer which forms a part of this invention has a molecular weight in the range of 30,000 to 300,000 and more preferably has a molecular weight in the range of 50,000 to 250,000. This copolymer product is completely different and readily distinguishable from the ethylene-propylene copolymer containing a major amount of polymerized ethylene which is recovered from a non-stereospecific polymerization process and is normally classified as an elastomer.

As one method of illustration, the following examples are given exemplifying one or more compositions included in this invention. Specifically, Examples I and III are given to illustrate the present state of the art, and Examples II and IV are given to illustrate the improvements achieved by the practice of the present invention.

EXAMPLE I

A sample of atactic polypropylene recovered from a stereospecific polymerization of propylene as described above is characterized as a solid tacky polymer product comprised of approximately 1.0 weight percent crystalline polymer, 19.4 weight percent stereoblock polymer, 76.2 weight percent amorphous polymer and 4.4 weight percent polymer oil. The atactic polypropylene is further characterized as having a Brookfield viscosity at 300°F. of 1,500 cps.; molecular weight of 14,000 as determined by intrinsic viscosity in decalin at 275°F. and a density of 0.85 at 77°F.

The above atatic polypropylene was blended with a paraffin wax characterized as having a melting point of 127°F. (AMP), SUS viscosity at 210°F. of 43.6, a penetration of 77°F. of 28 (ASTM D1321) and a 100°F. of 216 (ASTM D1321). The above paraffin wax is hereafter termed Wax A. Wax A and atactic polypropylene were blended in concentrations of 5, 10, 15, and 25 weight percent polymer in the wax composition. The blending of the wax and polymer is accomplished by melting the wax component at a temperature in the range of 200°–300°F., and thereafter adding the desired amount of atactic polypropylene. The physical properties of the finished wax-atactic polypropylene blends are given below in Table I, under the columns entitled APP.

EXAMPLE II

A sample of atactic propylene-ethylene block copolymer (PEBC) containing 26.2 weight percent copolymerized ethylene as measured by infrared analysis was recovered from the stereospecific polymerization of propylene-ethylene block copolymer as described above. The atactic polymer fraction was further characterized as containing 22.3 weight percent crystalline polymer, 14.2 weight percent stereoblock polymer, 61.7 weight percent amorphous polymer, and 1.5 weight percent polymer oil. Physical characteristics include a molecular weight of 200,000 as measured by intrinsic viscosity in decalin at 275°F.

This atactic propylene-ethylene block copolymer was blended with Wax A of Example I in the concentration of 2.5, 5.0, 10.0, and 15.0 weight percent polymer in wax. The physical characterizations of these wax blends are presented in Table I, under the columns entitled PEBC.

EXAMPLE III

A paraffin wax hereinafter termed Wax B having a melting point of 143.5 (AMP), and SUS viscosity at 210°F. of 40, a penetration at 77°F. of 8 and at 100°F. of 36 (ASTM D1321) was blended with a sample of atactic polypropylene identical to that disclosed in Example I in the same manner and in the same concentrations as disclosed in Example I. Physical characterizations in the waxpolymer blend of this example can be found in Table II under the columns entitled APP.

EXAMPLE IV

A sample of Wax B was blended with a sample of atactic propylene-ethylene block copolymer identical to that of Example II in the same manner as in the same polymer to wax concentrations. Physical characterizations of the wax-polymer blends of this example are presented in Table II under the columns entitled PEBC.

COMPARISON OF PHYSICAL CHARACTERISTICS OF PARAFFIN WAX BLENDS OF ATACTIC POLYPROPYLENE (APP) AND OF ATACTIC PROPYLENE-ETHYLENE BLOCK COPOLYMER (PEBC)

TABLE I

| 15 Wt. % Polymer In Blend | Vis. cp at 210°F. APP | PEBC | Adhesion gms/2" w. APP | PEBC | Pen. at 77°F. APP | PEBC |
| --- | --- | --- | --- | --- | --- | --- |
| 0 | 5.3 | 5.3 | 25.4 | 25.4 | 26 | 26 |
| 2.5 | — | 25 | — | 27.4 | — | 26 |
| 5 | 6.1 | 135 | 24.5 | 31.0 | 29 | 26 |
| 10 | 9.0 | — | 24.9 | 41.0 | 33 | 28 |
| 15 | 11.0 | — | 26.5 | 60.5 | 36 | — |
| 25 | 23.8 | — | 29.0 | — | 42 | — |

TABLE II

| Wt. % Polymer In Blend | Vis. cp at 210°F. APP | PEBC | Adhesion gms/2" w. APP | PEBC | Pen. at 77°F. APP | PEBC |
| --- | --- | --- | --- | --- | --- | --- |
| 0 | 3.3 | 5.3 | 8.0 | 8.0 | 9 | 9 |
| 2.5 | — | 40 | — | 10 | — | 10 |
| 5 | 6.0 | 74 | 13 | 18 | 11 | 10 |
| 10 | 8.9 | 135 | 19 | 44 | 14 | 10 |
| 15 | 13.0 | — | 24 | — | 16 | — |
| 25 | 29.0 | — | 34 | — | 22 | — |

An analysis of the results listed in Tables I and II illustrates the distinct improvement in the adhesion properties achieved when atactic propylene-ethylene terminal block copolymer is added to a paraffin wax composition. This fact is more clearly illustrated in FIGS. 1 and 2. For example, in FIG. 1 the prior art is represented by Blend "A" which presents the adhesion characteristics of the wax-atactic polypropylene compositions of Example I. Also in FIG. 1 is Blend "B" which presents the adhesion characteristics of the wax-atactic propylene-ethylene terminal block compositions of the present invention. In this figure it is easily recognized that the addition of only 5% atactic propylene-ethylene terminal block copolymer to wax improves the adhesion properties of that wax composition considerably more than the improvement achieved by atactic polypropylene. Also, in FIG. 2 the adhesion characteristics of atactic polypropylene wax blend of Example III is represented by Blend "C." The adhesion characteristics of the PEBC wax compositions of Example IV are represented in Blend "D." Here again the improvement of the adhesion characteristics of the wax compositions of the present invention over the prior art compositions is clearly demonstrated.

It has further been discovered that the above improvements realized by the present invention can be obtained with microcrystalline waxes; however, the improvements have been found to be most pronounced in paraffin wax compositions or wax compositions containing paraffin wax. However, only atactic propylene-ethylene terminal copolymers of the type hereinabove described have been found to provide the distinctly significant improvements herein disclosed.

The present invention therefore comprises a laminating wax composition consisting essentially of petroleum wax and 1 to 50 percent based on the weight of the mixture of solid atactic propylene-ethylene copolymer having a molecular weight in the range of 30,000 to 300,000 and containing 1 to 30 percent by weight of copolymerized ethylene. The preferred copolymer quantity in the compositions of the present invention is 1 to 30 percent by weight and the preferred molecular weight range of the copolymer contained in the compositions of the present invention is 50,000 to 250,000.

The adhesion test used herein for the laminating wax blend is performed as follows: Two strips of glassine paper, 2 inches by 6 inches, are laminated with the wax under test by pressing them mildly on a hot plate at a temperature just above the melting point of the wax. The load is adjusted to about 8 pounds of wax per ream of laminate, evenly distributed between the strips. This laminate is held at 73°F. in an atmosphere of 50 percent relative humidity for one hour before testing. Adhesion is the grams pull per 2-inch width required to separate the strips by peeling.

Laminating waxes of the microcrystalline type will have adhesion values, measured as described above, of from 30 to 120.

It is often desirable to blend microcrystalline and paraffin waxes to form suitable wax coating compositions. These blends are also useful for the purposes of the present invention.

Other additives for wax compositions well known to those skilled in the art, such as petroleum resins, polyterpene resins, vinyl polymers and copolymers such as polyvinyl chloride, ethylene-vinyl acetate, crystalline polyolefins such as polyethylene, polypropylene or polybutene, can be added to the compositions of the present invention without deviating from the intent and scope thereof.

The invention claimed is:

1. A water resistant fiberboard composition comprising a fibrous sheet coated with a laminating wax composition consisting essentially of petroleum wax and 1–50 percent based on the weight of the mixture of solid atactic propylene-ethylene terminal block copolymer having a molecular weight in the range of 30,000 to 300,000 and containing 1–30 percent by weight of copolymerized ethylene.

2. A container for packaging liquids formed from fibrous sheet material and provided with an adherent laminating wax composition, said composition being a wax composition according to claim 1.

* * * * *